United States Patent
Du et al.

(10) Patent No.: US 10,193,606 B2
(45) Date of Patent: Jan. 29, 2019

(54) BEAM CONFIGURATION METHOD AND DEVICE

(71) Applicant: HUAWEI TECHNOLOGIES CO., LTD., Shenzhen, Guangdong (CN)

(72) Inventors: Mingde Du, Chengdu (CN); Guangjian Wang, Chengdu (CN); Jiebo Yuan, Chengdu (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/605,139

(22) Filed: May 25, 2017

(65) Prior Publication Data

US 2017/0264353 A1     Sep. 14, 2017

Related U.S. Application Data

(63) Continuation of application No. PCT/CN2014/092239, filed on Nov. 26, 2014.

(51) Int. Cl.
    *H04B 1/00*        (2006.01)
    *H04B 7/06*        (2006.01)
    (Continued)

(52) U.S. Cl.
    CPC .............. *H04B 7/0617* (2013.01); *H01Q 3/34* (2013.01); *H01Q 21/22* (2013.01);
    (Continued)

(58) Field of Classification Search
    CPC ............ A61K 39/118; A61K 2039/505; A61K 2039/55505; A61K 2039/55561;
    (Continued)

(56) References Cited

U.S. PATENT DOCUMENTS

| 3,909,829 A | 9/1975 | Daly |
| RE45,379 E * | 2/2015 | Rowe .......................... 367/102 |

(Continued)

FOREIGN PATENT DOCUMENTS

| CN | 103812546 A | 5/2014 |
| CN | 103917937 A | 7/2014 |
| EP | 1184937 | 6/2002 |

OTHER PUBLICATIONS

Extended European Search Report, dated Nov. 11, 2017, in European Application No. 14906698.7 (10 pp.).
International Search Report dated Aug. 11, 2015 in corresponding International Patent Application No. PCT/CN2014/092239.
International Search Report, dated Aug. 11, 2015, in International Application No. PCT/CN2014/092239 (4 pp.).

*Primary Examiner* — Xin Jia
(74) *Attorney, Agent, or Firm* — Staas & Halsey LLP

(57) ABSTRACT

A beam configuration method and a device are provided and can resolve problems that a signal gain is a relatively low and utilization of an antenna array unit is low in a process of implementing omnidirectional coverage of a millimeter wave. A specific solution is as follows: determining whether an included angle between a ray that is perpendicular to a first plane and that extends outward from an electronic device and a ray pointing from the electronic device to a peer device is less than or equal to a preset angle, and when the included angle between the ray that is perpendicular to the first plane and that extends outward from the electronic device and the ray pointing from the electronic device to the peer device is less than or equal to the preset angle, performing end-fire state configuration on antenna array units in the first plane.

10 Claims, 3 Drawing Sheets

(51) Int. Cl.
*H01Q 3/34* (2006.01)
*H01Q 21/22* (2006.01)
*H04B 7/0408* (2017.01)
*H04W 16/28* (2009.01)
*H04B 7/08* (2006.01)

(52) U.S. Cl.
CPC .......... *H04B 7/0408* (2013.01); *H04B 7/086* (2013.01); *H04W 16/28* (2013.01)

(58) Field of Classification Search
CPC ...... A61K 39/00; A61K 39/02; C07K 14/195; H01Q 3/34; H01Q 21/22; H04B 7/0408; H04B 7/0617; H04W 16/28
See application file for complete search history.

(56) References Cited

U.S. PATENT DOCUMENTS

| | | |
|---|---|---|
| 2003/0186726 A1 | 10/2003 | Akita |
| 2008/0102760 A1 | 5/2008 | McConnell et al. |
| 2009/0231225 A1 | 9/2009 | Choudhury et al. |
| 2012/0081251 A1 | 4/2012 | Frigon et al. |
| 2014/0024328 A1* | 1/2014 | Balbien ................ H01Q 1/1257 455/269 |
| 2014/0242927 A1 | 8/2014 | Mooney et al. |
| 2014/0292595 A1 | 10/2014 | Kim et al. |
| 2015/0303587 A1* | 10/2015 | Pan ......................... H01Q 1/20 342/372 |

* cited by examiner

BEAM CONFIGURATION METHOD AND DEVICE

CROSS-REFERENCE TO RELATED APPLICATIONS

This application is a continuation of International Application No. PCT/CN2014/092239, filed on Nov. 26, 2014, the disclosure of which is hereby incorporated by reference in its entirety.

TECHNICAL FIELD

The present application relates to the field of communications technologies, and in particular, to a beam configuration method and a device.

BACKGROUND

During data transmission, as communications technologies are continuously improved, requirements for data transmission rates and data transmission capacities are also increased accordingly, and a millimeter wave (that is, an electromagnetic wave with a wavelength of 1 millimeter to 10 millimeters) has been gradually applied to the field of communications technologies. In a process of performing communication by using a millimeter wave, because a signal of the millimeter wave has a relatively large loss during transmission, an antenna on a base station side and an antenna on a terminal side need to provide a relatively high gain to compensate for the loss of the signal of the millimeter wave during transmission, so as to achieve an effect of high-quality communication. A gain refers to a ratio of a power density of a signal generated by a practical antenna to a power density of a signal generated by an ideal radiating element at a same point in space at a same input power.

In the prior art, in a process of performing communication by using the millimeter wave, omnidirectional beam coverage is usually implemented by respectively using a broadside antenna and an end-fire antenna to cover different spatial areas of an electronic device. However, in a process of implementing omnidirectional coverage of a millimeter wave by using a broadside antenna and an end-fire antenna, a broadside antenna array and an end-fire antenna array that are distributed on a terminal device separately and independently implement coverage of a beam in a corresponding direction, and a form of an antenna array cannot be changed once the antenna array is configured to be in a broadside operating state or an end-fire operating state. Therefore, a direction of a beam formed by the antenna array is fixed, and a signal of an antenna array unit has a relatively high gain only when a location of a peer device is within coverage of the beam formed by the antenna array. However, the location of the peer device is unfixed, and when the location of the peer device changes and the location of the peer device is not within coverage of the beam formed by the antenna array, the antenna array unit has a relatively low signal gain. Antenna array units in other directions are not effectively utilized except the antenna array unit pointing to the peer device, leading to low utilization of the antenna array units.

SUMMARY

Embodiments of the present application provide a beam configuration method and a device, so as to resolve problems in the prior art that an antenna array unit has a relatively low signal gain and utilization of the antenna array unit is low in a process of implementing omnidirectional coverage of a millimeter wave by using a broadside antenna and an end-fire antenna.

To implement the foregoing objective, the embodiments of the present application use the following technical solutions:

According to a first aspect, an embodiment of the present application provides a beam configuration method applied to an electronic device, where the electronic device includes a first plane, at least two antenna array units are configured for the first plane, and the method includes:

determining whether an included angle between a ray that is perpendicular to the first plane and that extends outward from the electronic device and a ray pointing from the electronic device to a peer device is less than or equal to a preset angle; and when the included angle between the ray that is perpendicular to the first plane and that extends outward from the electronic device and the ray pointing from the electronic device to the peer device is less than or equal to the preset angle, performing end-fire state configuration on the antenna array units in the first plane, so that a first beam is in a same direction as a normal line of the first plane, where the first beam is a beam formed by the antenna array units in the first plane.

According to a second aspect, an embodiment of the present application provides an electronic device, where the electronic device includes a first plane, at least two antenna array units are configured for the first plane, and the device includes:

a configuration unit, configured to determine whether an included angle between a ray that is perpendicular to the first plane and that extends outward from the electronic device and a ray pointing from the electronic device to a peer device is less than or equal to a preset angle, where the configuration unit is further configured to: when the included angle between the ray that is perpendicular to the first plane and that extends outward from the electronic device and the ray pointing from the electronic device to the peer device is less than or equal to the preset angle, perform end-fire state configuration on the antenna array units in the first plane, so that a first beam is in a same direction as a normal line of the first plane, where the first beam is a beam formed by the antenna array units in the first plane.

According to a third aspect, an embodiment of the present application provides an electronic device, including a processor, a bus, and a memory, where the processor and the memory are connected to each other by using the bus;

the processor is configured to determine whether an included angle between a ray that is perpendicular to a first plane and that extends outward from the electronic device and a ray pointing from the electronic device to a peer device is less than or equal to a preset angle; and the processor is further configured to: when the included angle between the ray that is perpendicular to the first plane and that extends outward from the electronic device and the ray pointing from the electronic device to the peer device is less than or equal to the preset angle, perform end-fire state configuration on the antenna array units in the first plane, so that a first beam is in a same direction as a normal line of the first plane, where the first beam is a beam formed by the antenna array units in the first plane.

According to the beam configuration method and the device provided in the embodiments of the present application, whether an included angle between a ray that is perpendicular to a first plane and that extends outward from an electronic device and a ray pointing from the electronic device to a peer device is less than or equal to a preset angle is determined; and when the included angle between the ray that is perpendicular to the first plane and that extends outward from the electronic device and the ray pointing from the electronic device to the peer device is less than or equal to the preset angle, end-fire state configuration is performed on antenna array units in the first plane. In this way, in a process of implementing omnidirectional coverage of a millimeter wave by using a broadside antenna and an end-fire antenna, dynamic configuration may be performed on an antenna array unit, so that a beam of an antenna array may be in a same direction as pointing to a peer device, which can resolve problems in the prior art that antenna arrays have a relatively low signal gain and utilization of antenna array units is low in a process of implementing omnidirectional coverage of a millimeter wave by using a broadside antenna and an end-fire antenna.

BRIEF DESCRIPTION OF DRAWINGS

To describe the technical solutions in the embodiments of the present application more clearly, the following briefly describes the accompanying drawings required for describing the embodiments. Apparently, the accompanying drawings in the following description show merely some embodiments of the present application, and a person of ordinary skill in the art may still derive other drawings from these accompanying drawings without creative efforts.

DESCRIPTION OF EMBODIMENTS

The following clearly describes the technical solutions in the embodiments of the present application with reference to the accompanying drawings in the embodiments of the present application. Apparently, the described embodiments are merely some but not all of the embodiments of the present application. All other embodiments obtained by a person of ordinary skill in the art based on the embodiments of the present application without creative efforts shall fall within the protection scope of the present application.

Figure 1:
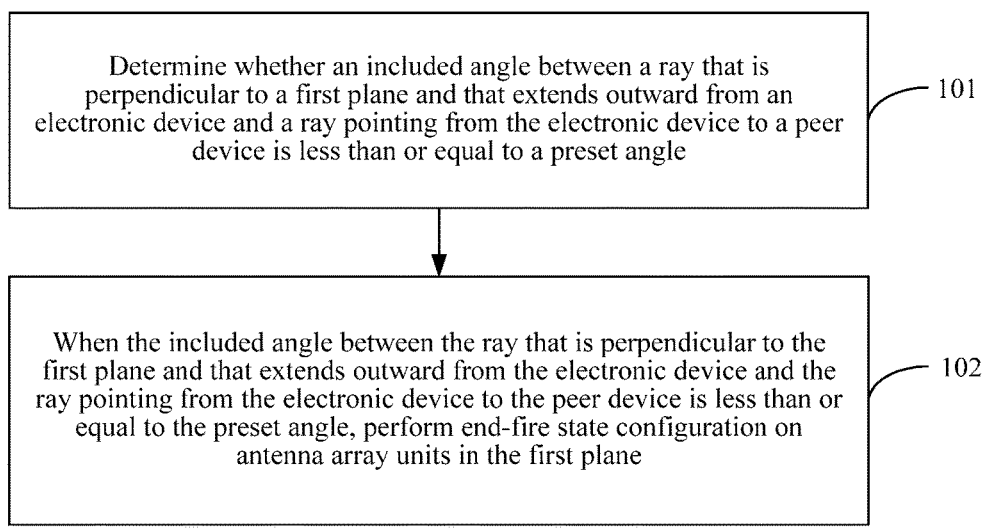
FIG. 1 is a schematic flowchart of a beam configuration method according to an embodiment of the present application.

An embodiment of the present application provides a beam configuration method applied to an electronic device. When the electronic device receives or transmits a signal, strength of the received signal or the transmitted signal may be increased by using an antenna array. The antenna array includes several antenna array units, and an operating principle of the antenna array may be seen as superimposition of electromagnetic waves or electromagnetic fields. The electronic device includes a first plane, one antenna array is configured for the first plane, and the one antenna array includes at least two antenna array units. When the electronic device and a peer device need to transmit information, as shown in FIG. 1, the beam configuration method may include:

101: Determine whether an included angle between a ray that is perpendicular to the first plane and that extends outward from the electronic device and a ray pointing from the electronic device to the peer device is less than or equal to a preset angle.

Figure 2:
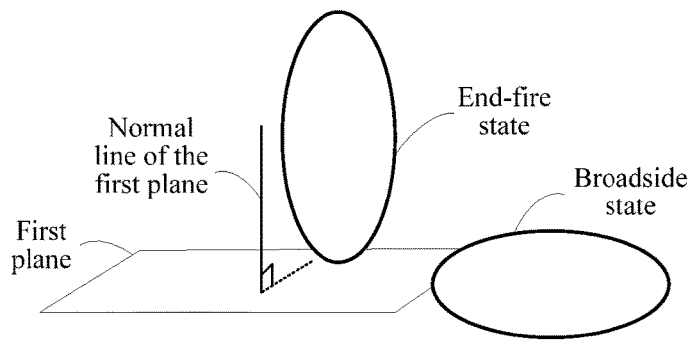
FIG. 2 is a schematic structural diagram of configuration of a first plane according to an embodiment of the present application.

The ray pointing from the electronic device to the peer device uses a point on the electronic device as an endpoint, and extends towards a point on the peer device. Preferably, the ray pointing from the electronic device to the peer device uses a central point on the electronic device as an endpoint, and extends towards a central point on the peer device. Optionally, the electronic device may include multiple planes, the multiple planes are planes of antenna array units included in the electronic device, and the first plane is any one of the multiple planes of the electronic device. When the electronic device includes only one plane, this plane is the first plane, as shown in FIG. 2, and the first plane is configured to be in an end-fire state or a broadside state. A beam formed by the antenna array units in the first plane is a first beam.

Optionally, the preset angle may be set in advance. This is not limited herein in the present application.

102: When the included angle between the ray that is perpendicular to the first plane and that extends outward from the electronic device and the ray pointing from the electronic device to the peer device is less than or equal to the preset angle, perform end-fire state configuration on the antenna array units in the first plane.

When antenna array units in a plane are in an end-fire state, a beam of the plane is in a same direction as the ray that is perpendicular to the first plane and that extends outward from the electronic device.

Optionally, a uniform straight-line array is used as an example for description, but it does not indicate that the present application is limited to only the uniform straight-line array. That is, each antenna array formed by antennas is the uniform straight-line array. The uniform straight-line array refers to that antenna array units have same structures and equal spacings, and are arranged in a straight line, current amplitudes of the antenna array units are equal, and phases of the antenna array units increase or decrease by a uniform proportion.

When each of the antenna array units in the first plane is in uniform straight-line distribution, array factors of the antenna array units in the first plane are $$f(\varphi) = \left| \frac{\sin \frac{N\varphi}{2}}{\sin \frac{\varphi}{2}} \right|,$$

and the array factors may satisfy an end-fire condition by adjusting a phase difference between the antenna array units in the first plane in the array factors, so that the end-fire state configuration is performed on the antenna array units in the first plane.

For the array factors $$f(\varphi) = \left| \frac{\sin\frac{N\varphi}{2}}{\sin\frac{\varphi}{2}} \right|,$$

where φ=ε+kd cos δ. φ is a wave path difference between different antenna array units, a wave path difference is a difference between propagation paths of different antenna array units from a wave source to a point, ε is a phase difference between the two antenna array units, $$k = \frac{2\pi}{\lambda},$$

k is a quantity of waves, λ is a wavelength, d is a distance between the two antenna array units, and δ is an included angle between the ray that is perpendicular to the first plane and that extends outward from the electronic device and a ray in the direction of the first beam.

Optionally, when the included angle between the ray that is perpendicular to the first plane and that extends outward from the electronic device and the ray pointing from the electronic device to the peer device is greater than the preset angle, broadside state configuration is performed on the antenna array units in the first plane.

When antenna array units in a plane are in a broadside state, a beam of the plane is in a same direction as a perpendicular line of a normal line of the plane.

The array factors of the antenna array units in the first plane are $$f(\varphi) = \left| \frac{\sin\frac{N\varphi}{2}}{\sin\frac{\varphi}{2}} \right|,$$

and the array factors may satisfy a condition of the broadside state by adjusting a phase difference between the antenna array units in the first plane, so that the broadside state configuration is performed on the antenna array units in the first plane.

Optionally, that each of the antenna array units in the first plane is in the uniform straight-line distribution is used as an example for description. When δ=0°, the first beam is in a same direction as a normal line of the first plane, and in this case, the array factors satisfy the condition of the end-fire state, the antenna array units are configured to be in the end-fire state; and when $$\delta = \frac{\pi}{2},$$

the first beam is in a same direction as a perpendicular line of the normal line of the first plane, and in this case, the array factors satisfy the condition of the broadside state, and the antenna array units are configured to be in the broadside state. Certainly, a value of δ may be adjusted, so that the beam of the antenna array is in a same direction as pointing to the peer device.

Optionally, the electronic device may include multiple planes, and whether there is a plane, of the multiple planes of the electronic device, which causes an included angle between a ray that is perpendicular to the plane and that extends outward from the electronic device and the ray pointing from the electronic device to the peer device is less than or equal to the preset angle is determined. When there is the plane, the plane is used as a principal plane, and antenna array units in the plane are configured to be in the end-fire state, or when there is not the plane, antenna array units in all planes in the electronic device are all configured to be in the broadside state. With reference to step 101, when the antenna array units in the first plane are in the end-fire state, the first plane is the principal plane.

According to the beam configuration method provided in this embodiment of the present application, whether an included angle between a ray that is perpendicular to a first plane and that extends outward from an electronic device and a ray pointing from the electronic device to a peer device is less than or equal to a preset angle is determined; and when the included angle between the ray that is perpendicular to the first plane and that extends outward from the electronic device and the ray pointing from the electronic device to the peer device is less than or equal to the preset angle, end-fire state configuration is performed on antenna array units in the first plane. In this way, in a process of implementing omnidirectional coverage of a millimeter wave by using a broadside antenna and an end-fire antenna, dynamic configuration may be performed on an antenna array unit, so that a beam of an antenna array may be in a same direction as pointing to a peer device, which can resolve problems in the prior art that antenna arrays have a relatively low signal gain and utilization of antenna array units is low in a process of implementing omnidirectional coverage of a millimeter wave by using a broadside antenna and an end-fire antenna.

Figure 3:
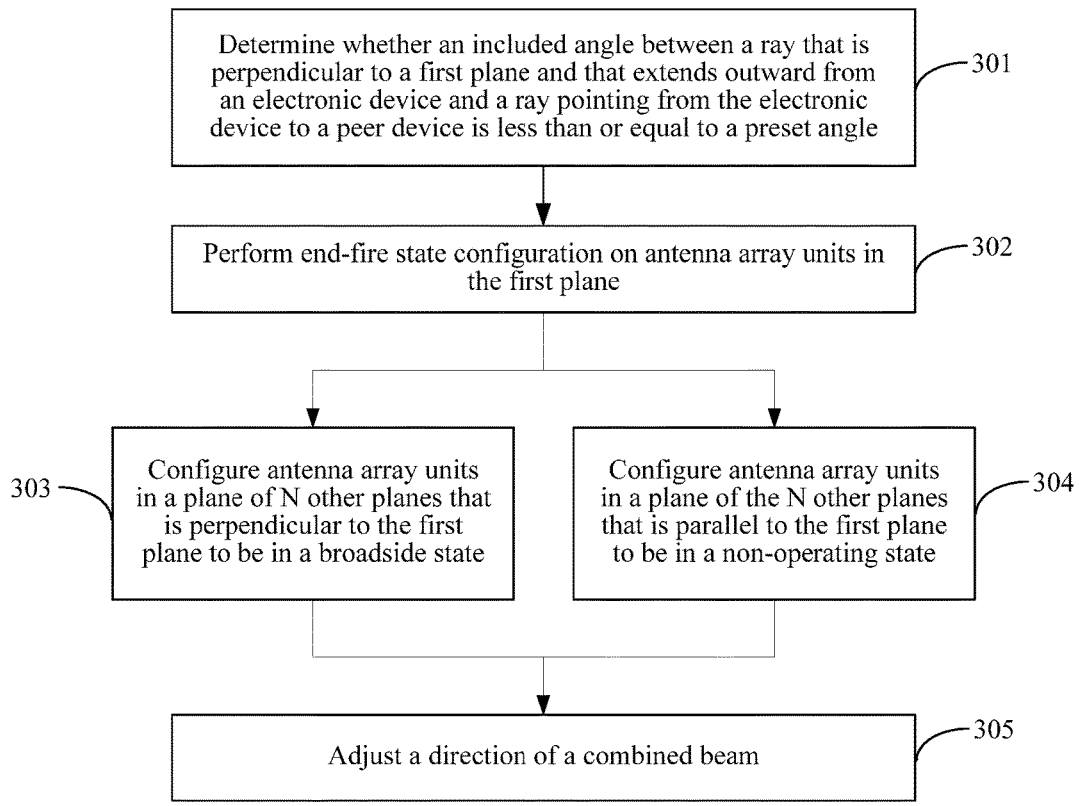
FIG. 3 is a schematic flowchart of another beam configuration method according to an embodiment of the present application.

An embodiment of the present application provides another beam configuration method applied to an electronic device. Optionally, the electronic device may include a first plane and N other planes, one antenna array is configured for each of the first plane and the N other planes, and the one antenna array includes at least two antenna array units, where N is an integer greater than zero, and each antenna may be seen as an antenna array unit. In this embodiment, N=2 is used as an example for description. When the electronic device and a peer device need to transmit information, as shown in FIG. 3, the beam configuration method may include:

301: Determine whether an included angle between a ray that is perpendicular to the first plane and that extends outward from the electronic device and a ray pointing from the electronic device to the peer device is less than or equal to a preset angle.

The first plane is a plane, in the electronic device, in which an included angle between a ray that is perpendicular to the plane and that extends outward from the electronic device and the ray pointing from the electronic device to the peer device is less than or equal to the preset angle. In this case, the first plane is a principal plane, and a beam formed by the antenna array units in the first plane is a first beam. The ray pointing from the electronic device to the peer device uses a point on the electronic device as an endpoint, and extends towards a point on the peer device. Preferably, the ray pointing from the electronic device to the peer device uses a central point on the electronic device as an endpoint, and extends towards a central point on the peer device.

Optionally, the electronic device may be a mobile phone, a television or the like. This is not limited herein in the present application.

Optionally, the preset angle may be set in advance, and before the preset angle is set in advance, a location at which the peer device is located may be determined in advance, which are not limited herein in the present application. Preferably, the preset angle may be 60°.

Optionally, for the first plane and the N planes of the electronic device, when any one of the first plane and the N planes does not satisfy a condition that the included angle between the ray that is perpendicular to the plane and that extends outward from the electronic device and the ray pointing from the electronic device to the peer device is less than or equal to the preset angle, each of the first plane and the N planes of the electronic device is configured to be in a broadside state.

Optionally, this embodiment is described by using an example in which the included angle between the ray that is perpendicular to the plane and that extends outward from the electronic device and the ray pointing from the electronic device to the peer device is less than or equal to the preset angle. The method further includes:

302: Perform end-fire state configuration on the antenna array units in the first plane.

When antenna array units in a plane are in an end-fire state, a beam of the plane is in a same direction as a normal line of the plane.

Optionally, a uniform straight-line array is used as an example for description, but it does not indicate that the present application is limited to only the uniform straight-line array. Each of the antenna array units in the first plane is in uniform straight-line distribution, array factors of the antenna array units in the first plane are $$f(\varphi) = \left| \frac{\sin\frac{N\varphi}{2}}{\sin\frac{\varphi}{2}} \right|,$$

that is, for the first plane, there is only one array factor, and the array factors may satisfy a condition of the end-fire state by adjusting a phase difference between the antenna array units in the first plane in the array factors, so that the end-fire state configuration is performed on the antenna array units in the first plane.

For the array factors $$f(\varphi) = \left| \frac{\sin\frac{N\varphi}{2}}{\sin\frac{\varphi}{2}} \right|,$$

$\varphi = \varepsilon + kd \cos \delta$, $\varphi$ is a wave path difference between different antenna array units, $\varepsilon$ is a phase difference between the two antenna array units, $$k = \frac{2\pi}{\lambda},$$

k is a quantity of waves, $\lambda$ is a wavelength, d is a distance between the two antenna array units, and $\delta$ is an included angle between a ray that is perpendicular to the first plane and that extends outward from the electronic device and a ray in a direction of the first beam.

Optionally, that each of the antenna array units in the first plane is in the uniform straight-line distribution is used as an example for description. When $\delta=0°$, the first beam is in a same direction as a normal line of the first plane, and in this case, the array factors satisfy the condition of the end-fire state, the antenna array units are configured to be in the end-fire state; and when $$\delta = \frac{\pi}{2},$$

the first beam is in a same direction as a perpendicular line of the normal line of the first plane, and in this case, the array factors satisfy a condition of a broadside state, and the antenna array units are configured to be in the broadside state. Certainly, a value of $\delta$ may be adjusted, so that the beam of the antenna array is in a same direction as pointing to the peer device.

Further, the antenna array units are configured to be in the end-fire state, that is, the first beam is in a same direction as the normal line of the first plane, that is, $\delta=0$, and $\varepsilon+kd \cos 0=0$ needs to be satisfied, that is, $\varepsilon=kd$, equivalent to $\varepsilon_{max}=0$. In this case, the antenna array units radiate in a same direction as the normal line of the first plane.

303: Configure antenna array units in a plane of N other planes that is perpendicular to the first plane to be in a broadside state.

Specifically, when an $n^{th}$ other plane of the N other planes is perpendicular to the first plane, broadside state configuration is performed on antenna array units in the $n^{th}$ other plane, so that an $n^{th}$ other beam is in a same direction as a perpendicular line of a normal line of the $n^{th}$ other plane.

When antenna array units in a plane are in the broadside state, a beam of the plane is in a same direction as a perpendicular line of a normal line of the plane.

Optionally, each of the antenna array units in the first plane is in uniform straight-line distribution, that is, each antenna array formed by antennas is a uniform straight-line array. The uniform straight-line array refers to that antenna array units have same structures and equal spacings, and are arranged in a straight line, current amplitudes of the antenna array units are equal, and phases of the antenna array units increase or decrease by a uniform proportion. The array factors of the first plane are $$f(\varphi) = \left| \frac{\sin\frac{N\varphi}{2}}{\sin\frac{\varphi}{2}} \right|,$$

and the array factors may satisfy the condition of the broadside state by adjusting a phase difference between the antenna array units in the first plane in the array factors, so that the end-fire state configuration is performed on the antenna array units in the first plane.

Further, the antenna array units are configured to be in the broadside state, that is, the first beam is in a same direction as a perpendicular line of a normal line of the first plane, that is, $$\delta = \frac{\pi}{2},$$

and ε=0 and φ=kd cos δ need to be satisfied. In this case, the antenna array units radiate in a same direction as the perpendicular line of the normal line of the first plane.

Optionally, after step 302, the method may further include:

304: Configure antenna array units in a plane of the N other planes that is parallel to the first plane to be in a non-operating state.

Optionally, when an $n^{th}$ other plane of the N other planes is parallel to the first plane, antenna array units in the $n^{th}$ other plane are configured to be in the non-operating state.

Figure 4:
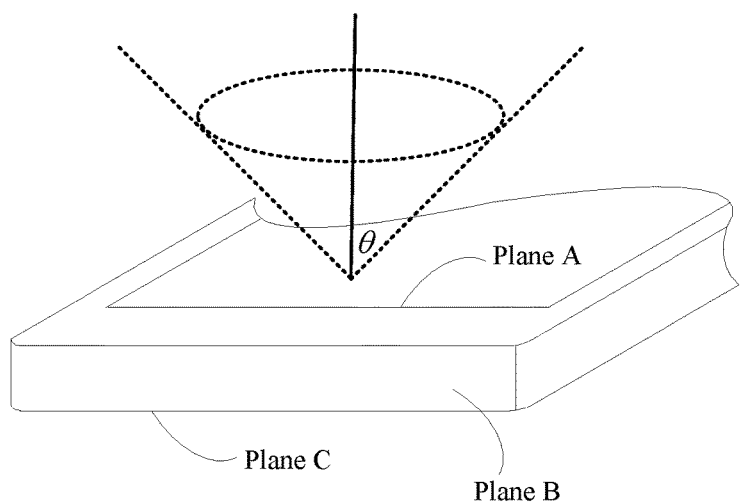
FIG. 4 is a schematic structural diagram of another configuration of a first plane according to an embodiment of the present application.

Optionally, that antenna array units are distributed in three planes of the electronic device is used as an example for description. As shown in FIG. 4, when antenna array units are distributed in three planes of the electronic device, a principal plane is plane A, a plane perpendicular to the plane A is plane B, and a plane parallel to the plane A is plane C.

When it is determined that an included angle between a ray that is perpendicular to the plane A and that extends outward from the electronic device and the ray pointing from the electronic device to the peer device is less than or equal to the preset angle, the array factors may satisfy the condition of the end-fire state by adjusting a phase difference between antenna array units in the principal plane, and the antenna array units in the plane A are configured to be in the end-fire state. Similarly, the array factors may satisfy the condition of the broadside state by adjusting a phase difference between antenna array units in the plane B, the antenna array units in the plane B are configured to be in the broadside state, and the plane C is configured to be in the non-operating state.

305: Adjust a direction of a combined beam.

The direction of the combined beam is adjusted, so that the combined beam is in a same direction as the ray pointing from the electronic device to the peer device, where the combined beam is a beam obtained by combining the first beam and N other beams.

After antenna array units in each plane of the electronic device are configured, both a direction of a beam formed by the antenna array in the end-fire state and a direction of a beam formed by the antenna array in the broadside state are fixed. Because a direction of the peer device is unnecessarily the direction of the beam formed by the antenna array after the antenna array units are configured to be in the end-fire state or the broadside state, that is, there may be an included angle between the direction of the beam formed by the antenna array after the configuration and the direction of the peer device, the combined beam may be in a same direction as the ray pointing from the electronic device to the peer device by adjusting the direction of the combined beam. In this way, the peer device can communicate with the electronic device when signal strength is relatively high.

Specifically, beams may be combined by means of amplitudes and phases of the beams. The amplitude of the beam is a maximum value by which a physical quantity deviates from a balance position during beam vibration and the phase of the beam is used to describe a physical quantity in a beam vibration state.

Optionally, beams are usually combined by using the array directivity pattern product theorem. The array directivity pattern product theorem refers to that an array directivity pattern function is a product of an array factor and a unit factor, that is, a formula $S(\theta|_\varphi) = f(\theta|_p) * F(\theta|_\varphi)$, where $S(\theta|_\varphi)$ is an array directivity pattern function, $f(\theta|_\varphi)$ is an array factor, and $F(\theta|_\varphi)$ is a unit factor. For the array directivity pattern function, there are many optimization algorithms that may process the array directivity pattern function. The optimization algorithms may be a genetic algorithm, a particle swarm algorithm, a simulated annealing algorithm and the like. This is not specifically limited herein in the present application.

According to the beam configuration method provided in this embodiment of the present application, whether an included angle between a ray that is perpendicular to a first plane and that extends outward from an electronic device and a ray pointing from the electronic device to a peer device is less than or equal to a preset angle is determined; when the included angle between the ray that is perpendicular to the first plane and that extends outward from the electronic device and the ray pointing from the electronic device to the peer device is less than or equal to the preset angle, end-fire state configuration is performed on antenna array units in the first plane; or when the included angle between the ray that is perpendicular to the first plane and that extends outward from the electronic device and the ray pointing from the electronic device to the peer device is greater than the preset angle, broadside state configuration is performed on antenna array units in the first plane. In this way, in a process of implementing omnidirectional coverage of a millimeter wave by using a broadside antenna and an end-fire antenna, dynamic configuration may be performed on an antenna array unit, so that a beam of an antenna array may be in a same direction as pointing to a peer device, which can resolve problems in the prior art that antenna arrays have a relatively low signal gain and utilization of antenna array units is low in a process of implementing omnidirectional coverage of a millimeter wave by using a broadside antenna and an end-fire antenna.

Figure 5:
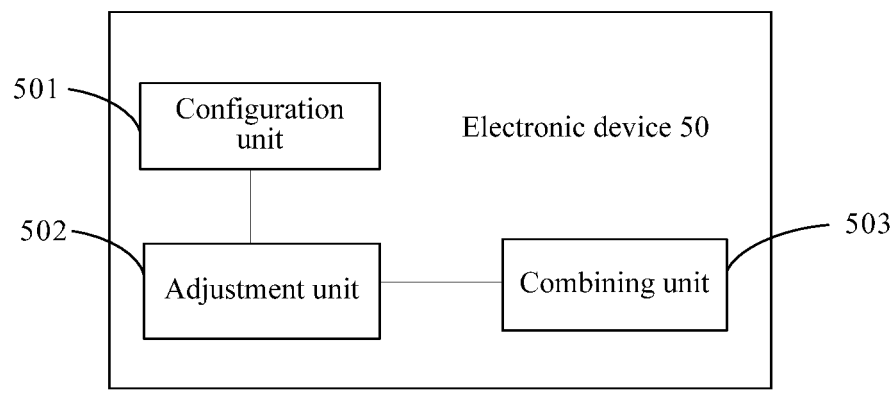
FIG. 5 is a schematic structural diagram of an electronic device according to an embodiment of the present application.

An embodiment of the present application provides an electronic device, applied to beam configuration. As shown in FIG. 5, the electronic device includes a first plane, and at least two antenna array units are configured for the first plane. When the electronic device and a peer device need to transmit information, the electronic device 50 may include a configuration unit 501.

The configuration unit 501 is configured to determine whether an included angle between a ray that is perpendicular to the first plane and that extends outward from the electronic device 50 and a ray pointing from the electronic device to the peer device is less than or equal to a preset angle.

The configuration unit is further configured to: when the included angle between the ray that is perpendicular to the first plane and that extends outward from the electronic device 50 and the ray pointing from the electronic device to the peer device is less than or equal to the preset angle, perform end-fire state configuration on the antenna array units in the first plane, so that a first beam is in a same direction as a normal line of the first plane, where the first beam is a beam formed by the antenna array units in the first plane.

Optionally, the configuration unit 501 is further configured to: when the included angle between the ray that is perpendicular to the first plane and that extends outward from the electronic device 50 and the ray pointing from the electronic device to the peer device is greater than the preset angle, perform broadside state configuration on the antenna array units in the first plane, so that the first beam is in a same direction as a perpendicular line of the normal line of the first plane.

Optionally, when each of the antenna array units in the first plane is in uniform straight-line distribution, array factors of the antenna array units in the first plane are $$f(\varphi) = \left| \frac{\sin\frac{N\varphi}{2}}{\sin\frac{\varphi}{2}} \right|,$$

where φ=ε+kd cos δ, φ is a wave path difference between different antenna array units, ε is a phase difference between the two antenna array units, $$k = \frac{2\pi}{\lambda},$$

k is a quantity of waves, λ is a wavelength, d is a distance between the two antenna array units, and δ is an included angle between the ray that is perpendicular to the first plane and that extends outward from the electronic device and a ray in the direction of the first beam.

The electronic device 50 further includes an adjustment unit 502, configured to adjust a phase difference between the antenna array units in the first plane, so that the array factors satisfy a condition of a broadside state.

Optionally, each of the antenna array units in the first plane is in uniform straight-line distribution, array factors of the antenna array units in the first plane are $$f(\varphi) = \left| \frac{\sin\frac{N\varphi}{2}}{\sin\frac{\varphi}{2}} \right|,$$

where φ=ε+kd cos δ, φ is a wave path difference between different antenna array units, ε is a phase difference between the two antenna array units, $$k = \frac{2\pi}{\lambda},$$

k is a quantity of waves, λ is a wavelength, d is a distance between the two antenna array units, and δ is an included angle between the ray that is perpendicular to the first plane and that extends outward from the electronic device and a ray in the direction of the first beam.

The adjustment unit 502 is further configured to adjust a phase difference between the antenna array units 502 in the first plane, so that the array factors satisfy a condition of an end-fire state.

Optionally, the electronic device 50 further includes N other planes, at least two antenna array units are configured for each of the N other planes, and N is an integer greater than zero.

The configuration unit 501 is further configured to: when an $n^{th}$ other plane of the N other planes is perpendicular to the first plane, perform broadside state configuration on antenna array units in the $n^{th}$ other plane, so that an $n^{th}$ other beam is in a same direction as a perpendicular line of a normal line of the $n^{th}$ other plane.

The configuration unit 501 is further configured to: when an $n^{th}$ other plane of the N other planes is parallel to the first plane, configure antenna array units in the $n^{th}$ other plane to be in a non-operating state.

Optionally, the electronic device 50 further includes a combining unit 503, configured to adjust a direction of a combined beam, so that the combined beam is in a same direction as the ray pointing from the electronic device to the peer device, where the combined beam is a beam obtained by combining the first beam and N other beams.

According to the electronic device provided in this embodiment of the present application, whether an included angle between a ray that is perpendicular to a first plane and that extends outward from an electronic device and a ray pointing from the electronic device to a peer device is less than or equal to a preset angle is determined; when the included angle between the ray that is perpendicular to the first plane and that extends outward from the electronic device and the ray pointing from the electronic device to the peer device is less than or equal to the preset angle, end-fire state configuration is performed on antenna array units in the first plane; or when the included angle between the ray that is perpendicular to the first plane and that extends outward from the electronic device and the ray pointing from the electronic device to the peer device is greater than the preset angle, broadside state configuration is performed on antenna array units in the first plane. In this way, in a process of implementing omnidirectional coverage of a millimeter wave by using a broadside antenna and an end-fire antenna, dynamic configuration may be performed on an antenna array unit, so that a beam of an antenna array may be in a same direction as pointing from the electronic device to a peer device, which can resolve problems in the prior art that antenna arrays have a relatively low signal gain and utilization of antenna array units is low in a process of implementing omnidirectional coverage of a millimeter wave by using a broadside antenna and an end-fire antenna.

Figure 6:
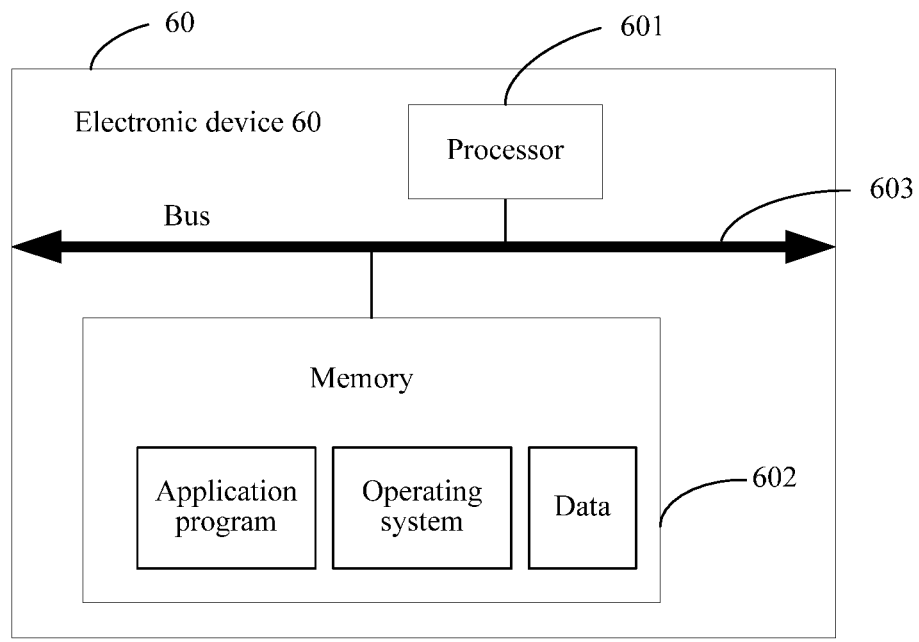
FIG. 6 is a schematic structural diagram of another electronic device according to an embodiment of the present application.

An embodiment of the present application provides an electronic device 60. Referring to FIG. 6, the device may be built in or the device is a microprocessing computer, for example: a general-purpose computer, a customized computer, a mobile phone terminal, a tablet computer and other portable devices. The electronic device 60 includes: at least one processor 601, a memory 602, and a bus 603, where the at least one processor 601 and the memory 602 are connected by using the bus 603 and complete mutual communication.

The bus 603 may be an ISA (Industry Standard Architecture) bus, a PCI (peripheral component interconnect) bus, an EISA (Extended Industry Standard Architecture) bus, or the like. The bus 603 may be classified into an address bus, a data bus, a control bus, and the like. For convenience of representation, the bus in FIG. 6 is represented by using only one bold line, but it does not indicate that there is only one bus or only one type of bus.

The memory 602 is used for application program code for executing the solution of the present application, where the application program code for executing the solution of the present application is stored in the memory, and is controlled and executed by the processor 601.

The memory may be a read-only memory ROM, a static storage device of another type static that can store static information and an instruction, a random access memory RAM, or a dynamic storage device of another type that can store information and an instruction, or may be an electrically erasable programmable read-only memory EEPROM, a read-only optical disc CD-ROM or another optical disc storage, a disc storage (including a compact disc, a laser disc, an optical disc, a digital versatile disc, a Blu-ray disc, or the like), a magnetic disk storage medium or another magnetic disk storage device, or any other medium that can be used to carry or store expected program code in an instruction or data structure form and that can be accessed by a computer, but the present application is not limited thereto. These memories are connected to the processor by using the bus.

The processor 601 may be a central processing unit 601 (CPU for short), or an application specific integrated circuit (ASIC for short), or may be one or more integrated circuits configured to implement the embodiments of the present application.

The processor 601 is configured to call program code in the memory 602, to implement the following functions in a possible implementation manner when the foregoing application program is executed by the processor 601.

The the processor 601 is configured to determine whether an included angle between a ray that is perpendicular to a first plane and that extends outward from the electronic device 60 and a ray pointing from the electronic device to the peer device is less than or equal to a preset angle.

The processor is further configured to: when the included angle between the ray that is perpendicular to the first plane and that extends outward from the electronic device 60 and the ray pointing from the electronic device to the peer device is less than or equal to the preset angle, perform end-fire state configuration on the antenna array units in the first plane, so that a first beam is in a same direction as a normal line of the first plane, where the first beam is a beam formed by the antenna array units in the first plane.

Optionally, the processor 601 is further configured to: when the included angle between the ray that is perpendicular to the first plane and that extends outward from the electronic device 60 and the ray pointing from the electronic device to the peer device is greater than the preset angle, perform broadside state configuration on the antenna array units in the first plane, so that the first beam is in a same direction as a perpendicular line of the normal line of the first plane.

Optionally, when each of the antenna array units in the first plane is in uniform straight-line distribution, array factors of the antenna array units in the first plane are $$f(\varphi) = \left| \frac{\sin \frac{N\varphi}{2}}{\sin \frac{\varphi}{2}} \right|,$$

where $\varphi=\varepsilon+kd \cos \delta$, $\varphi$ is a wave path difference between different antenna array units, $\lambda$ is a phase difference between the two antenna array units, $$k = \frac{2\pi}{\lambda},$$

k is a quantity of waves, $\lambda$ is a wavelength, d is a distance between the two antenna array units, and $\delta$ is an included angle between the ray that is perpendicular to the first plane and that extends outward from the electronic device and a ray in the direction of the first beam.

The processor 601 is configured to adjust a phase difference between the antenna array units in the first plane, so that the array factors satisfy a condition of a broadside state.

Optionally, each of the antenna array units in the first plane is in uniform straight-line distribution, array factors of the antenna array units in the first plane are $$f(\varphi) = \left| \frac{\sin \frac{N\varphi}{2}}{\sin \frac{\varphi}{2}} \right|,$$

where $\varphi=\varepsilon+kd \cos \delta$, $\varphi$ is a wave path difference between different antenna array units, $\varepsilon$ is a phase difference between the two antenna array units, $$k = \frac{2\pi}{\lambda},$$

k is a quantity of waves, $\lambda$ is a wavelength, d is a distance between the two antenna array units, and $\delta$ is an included angle between the ray that is perpendicular to the first plane and that extends outward from the electronic device and a ray in the direction of the first beam.

The processor 601 is further configured to adjust a phase difference between the antenna array units in the first plane, so that the array factors satisfy a condition of an end-fire state.

Optionally, the electronic device 60 further includes N other planes, at least two antenna array units are configured for each of the N other planes, and N is an integer greater than zero.

The the processor 601 is further configured to: when an $n^{th}$ other plane of the N other planes is perpendicular to the first plane, perform broadside state configuration on antenna array units in the $n^{th}$ other plane, so that an $n^{th}$ other beam is in a same direction as a perpendicular line of a normal line of the $n^{th}$ other plane.

The processor 601 is further configured to: when an $n^{th}$ other plane of the N other planes is parallel to the first plane, configure antenna array units in the $n^{th}$ other plane to be in a non-operating state.

Optionally, the processor 601 is further configured to adjust a direction of a combined beam, so that the combined beam is in a same direction as the ray pointing from the electronic device to the peer device, where the combined beam is a beam obtained by combining the first beam and N other beams.

According to the electronic device provided in this embodiment of the present application, whether an included angle between a ray that is perpendicular to a first plane and that extends outward from an electronic device and a ray pointing from the electronic device to a peer device is less than or equal to a preset angle is determined; when the included angle between the ray that is perpendicular to the first plane and that extends outward from the electronic device and the ray pointing from the electronic device to the peer device is less than or equal to the preset angle, end-fire state configuration is performed on antenna array units in the first plane; or when the included angle between the ray that is perpendicular to the first plane and that extends outward from the electronic device and the ray pointing from the electronic device to the peer device is greater than the preset angle, broadside state configuration is performed on antenna array units in the first plane. In this way, in a process of implementing omnidirectional coverage of a millimeter wave by using a broadside antenna and an end-fire antenna, dynamic configuration may be performed on an antenna array unit, so that a beam of an antenna array may be in a same direction as pointing from the electronic device to a peer device, which can resolve problems in the prior art that antenna arrays have a relatively low signal gain and utilization of antenna array units is low in a process of implementing omnidirectional coverage of a millimeter wave by using a broadside antenna and an end-fire antenna.

With descriptions of the foregoing embodiments, a person skilled in the art may clearly understand that the present application may be implemented by hardware, firmware or a combination thereof. When the present application is implemented by software, the foregoing functions may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another. The storage medium may be any available medium accessible to a computer. Examples of the computer-readable medium include but are not limited to: a RAM (Random Access Memory), a ROM (Read-Only Memory), an EEPROM (Electrically Erasable Programmable Read-Only Memory), a CD-ROM (Compact Disc Read-Only Memory) or other optical disc storage, a disk storage medium or other disk storage, or any other medium that can be used to carry or store expected program code in a command or data structure form and can be accessed by a computer. In addition, any connection may be appropriately defined as a computer-readable medium. For example, when software is transmitted from a website, a server or another remote source by using a coaxial cable, an optical fiber/cable, a twisted pair, a DSL (Digital Subscriber Line) or wireless technologies such as infrared ray, radio and microwave, the coaxial cable, optical fiber/cable, twisted pair, DSL or wireless technologies such as infrared ray, radio and microwave are included in a definition of a medium to which they belong. For example, a disk and a disc used by the present application includes a CD (Compact Disc), a laser disc, an optical disc, a DVD disc (Digital Versatile Disc), a floppy disk and a Blu-ray disc, where the disk generally copies data by a magnetic means, and the disc copies data optically by a laser means. The foregoing combination should also be included in the protection scope of the computer-readable medium.

The foregoing descriptions are merely specific implementation manners of the present application, but are not intended to limit the protection scope of the present application. Any variation or replacement readily figured out by a person skilled in the art within the technical scope disclosed in the present application shall fall within the protection scope of the present application. Therefore, the protection scope of the present application shall be subject to the protection scope of the claims.

What is claimed is:

1. A beam configuration method applied to an electronic device, wherein the electronic device comprises a first plane, the first plane comprises at least two antenna array units, and the method comprises:
determining whether an included angle between a ray that is perpendicular to the first plane and that extends outward from the electronic device and a ray pointing from the electronic device to a peer device is less than or equal to a preset angle; and
when the included angle between the ray that is perpendicular to the first plane and that extends outward from the electronic device and the ray pointing from the electronic device to the peer device is less than or equal to the preset angle, adjusting a phase difference between the antenna array units in the first plane, so that the array factors satisfy a condition of an end-fire state;
when the at least two antenna array units in the first plane are in uniform straight-line distribution, array factors of the antenna array units in the first plane are $$f(\varphi) = \left| \frac{\sin\frac{N\varphi}{2}}{\sin\frac{\varphi}{2}} \right|,$$

wherein $\varphi = \varepsilon + kd \cos \delta$, $\varphi$ is a wave path difference between different antenna array units, $\varepsilon$ is a phase difference between the two antenna array units, $$k = \frac{2\pi}{\lambda},$$

k is a quantity of waves, $\lambda$ is a wavelength, d is a distance between the two antenna array units, and $\delta$ is an included angle between the ray that is perpendicular to the first plane and that extends outward from the electronic device and a ray in the direction of the first beam.

2. The method according to claim 1, wherein the method further comprises:
when the included angle between the ray that is perpendicular to the first plane and that extends outward from the electronic device and the ray pointing from the electronic device to the peer device is greater than the preset angle, performing broadside state configuration on the antenna array units in the first plane, so that the first beam is in a same direction as a perpendicular line of the normal line of the first plane.

3. The method according to claim 2, wherein
the performing broadside state configuration on the antenna array units in the first plane comprises:
adjusting a phase difference between the antenna array units in the first plane, so that the array factors satisfy a condition of a broadside state.

4. The method according to claim 1, wherein the electronic device further comprises N other planes, at least two antenna array units are configured for each of the N other planes, N is an integer greater than zero, and when the included angle between the ray that is perpendicular to the first plane and that extends outward from the electronic device and the ray pointing from the electronic device to the peer device is less than or equal to the preset angle, the method further comprises:
when an $n^{th}$ other plane of the N other planes is perpendicular to the first plane, performing broadside state configuration on antenna array units in the $n^{th}$ other plane, so that an $n^{th}$ other beam is in a same direction as a perpendicular line of a normal line of the $n^{th}$ other plane; or
when an $n^{th}$ other plane of the N other planes is parallel to the first plane, configuring antenna array units in the $n^{th}$ other plane to be in a non-operating state.

5. The method according to claim 4, wherein after all antenna array units of the N other planes are configured, the method further comprises:
adjusting a direction of a combined beam, so that the combined beam is in a same direction as the ray pointing from the electronic device to the peer device, wherein the combined beam is a beam obtained by combining the first beam and N other beams.

6. An electronic device, comprising:
a processor;
a bus; and
a memory, wherein the processor and the memory are connected to each other by using the bus;
the processor is configured to determine whether an included angle between a ray that is perpendicular to a first plane and that extends outward from the electronic device and a ray pointing from the electronic device to a peer device is less than or equal to a preset angle; and
the processor is further configured to: when the included angle between the ray that is perpendicular to the first plane and that extends outward from the electronic device and the ray pointing from the electronic device to the peer device is less than or equal to the preset angle, adjust a phase difference between the antenna array units in the first plane, so that the array factors satisfy a condition of an end-fire state; when the at least two antenna array units in the first plane are in uniform straight-line distribution, array factors of the antenna array units in the first plane are $$f(\varphi) = \left| \frac{\sin \frac{N\varphi}{2}}{\sin \frac{\varphi}{2}} \right|,$$

wherein $\varphi = \varepsilon + kd \cos \delta$, $\varphi$ is a wave path difference between different antenna array units, $\varepsilon$ is a phase difference between the two antenna array units, $$k = \frac{2\pi}{\lambda},$$

k is a quantity of waves, $\lambda$ is a wavelength, d is a distance between the two antenna array units, and $\delta$ is an included angle between the ray that is perpendicular to the first plane and that extends outward from the electronic device and a ray in the direction of the first beam.

7. The electronic device according to claim 6, wherein
the processor is further configured to: when the included angle between the ray that is perpendicular to the first plane and that extends outward from the electronic device and the ray pointing from the electronic device to the peer device is greater than the preset angle, perform broadside state configuration on the antenna array units in the first plane, so that the first beam is in a same direction as a perpendicular line of the normal line of the first plane.

8. The electronic device according to claim 7, wherein the processor is configured to adjust a phase difference between the antenna array units in the first plane, so that the array factors satisfy a condition of a broadside state.

9. The electronic device according to claim 6, wherein the electronic device further comprises N other planes, at least two antenna array units are configured for each of the N other planes, and N is an integer greater than zero; and
the processor is further configured to: when an $n^{th}$ other plane of the N other planes is perpendicular to the first plane, perform broadside state configuration on antenna array units in the $n^{th}$ other plane, so that an $n^{th}$ other beam is in a same direction as a perpendicular line of a normal line of the $n^{th}$ other plane; or
the processor is further configured to: when an $n^{th}$ other plane of the N other planes is parallel to the first plane, configure antenna array units in the $n^{th}$ other plane to be in a non-operating state.

10. The electronic device according to claim 9, wherein
the processor is further configured to adjust a direction of a combined beam, so that the combined beam is in a same direction as the ray pointing from the electronic device to the peer device, wherein the combined beam is a beam obtained by combining the first beam and N other beams.

* * * * *